No. 758,812. PATENTED MAY 3, 1904.
B. H. BENNETTS & L. J. W. JONES.
SLAG CAR.
APPLICATION FILED AUG. 12, 1903.
NO MODEL. 2 SHEETS—SHEET 1.

WITNESSES:
Frederic J Shaw
George H. Berry

Benjamin H. Bennetts
Llewellyn J. W. Jones
INVENTORS

BY T. J. Elliott
ATTORNEY.

No. 758,812. Patented May 3, 1904.

UNITED STATES PATENT OFFICE.

BENJAMIN H. BENNETTS AND LLEWELLYN J. W. JONES, OF TACOMA, WASHINGTON.

SLAG-CAR.

SPECIFICATION forming part of Letters Patent No. 758,812, dated May 3, 1904.

Application filed August 12, 1903. Serial No. 169,281. (No model.)

*To all whom it may concern:*

Be it known that we, BENJAMIN H. BENNETTS, a citizen of Tasmania, and LLEWELLYN J. W. JONES, formerly a citizen of Great Britain, but having taken out his first naturalization papers in the United States, residents of Tacoma, in the county of Pierce and State of Washington, have invented certain new and useful Improvements in Slag-Cars, of which the following is a specification.

Our invention relates to receptacles which receive, transport, and dump the slag from a smelter; and the objects of our invention are, first, to cause the slag to be dumped in one solid mass; second, to cause the slag to dump from the pot without any hammering or prying; third, to dump the slag in any direction, and, fourth, to provide a reversible car. We attain these objects by the devices illustrated in the accompanying drawings, in which—

Figure 1:
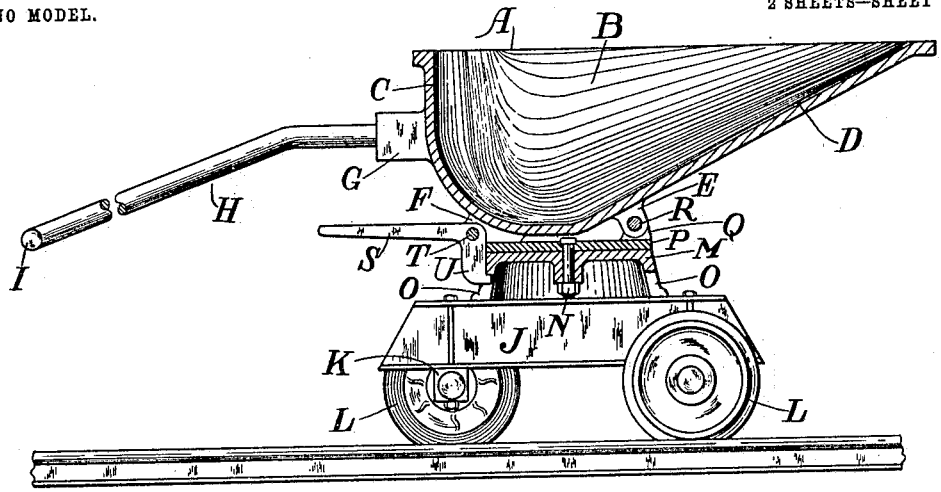
Figure 2:
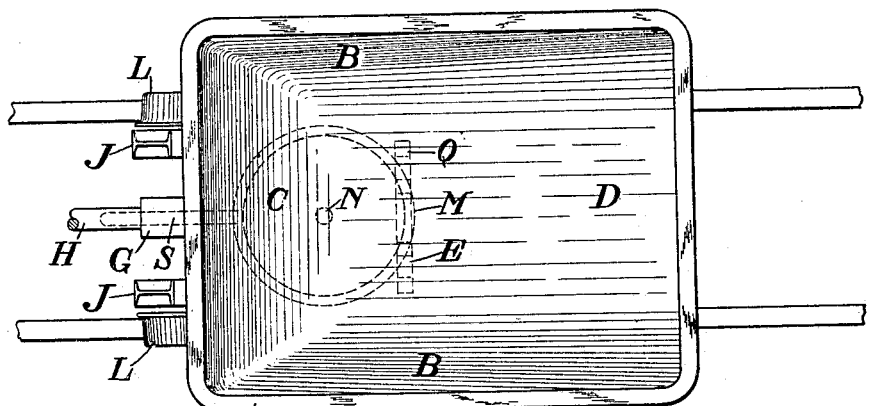
Figure 3:
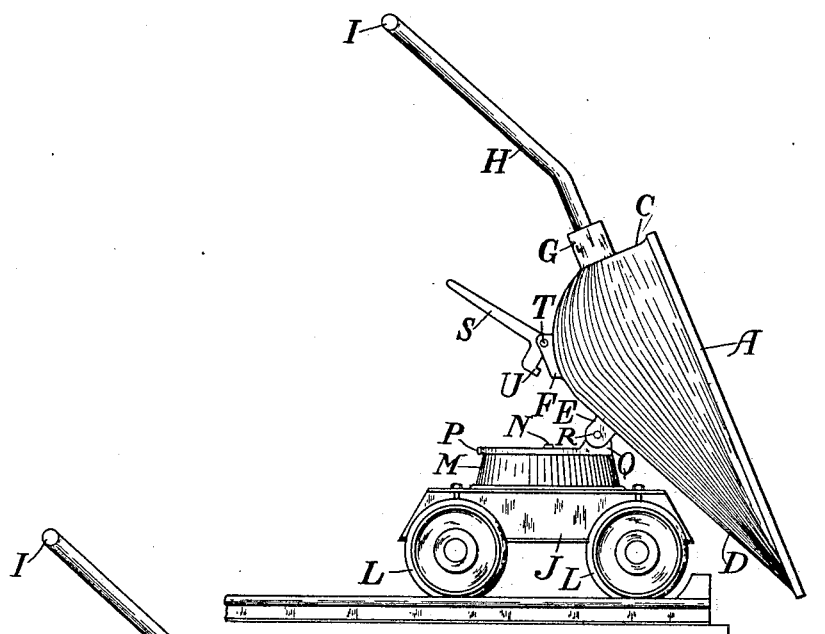
Figure 4:
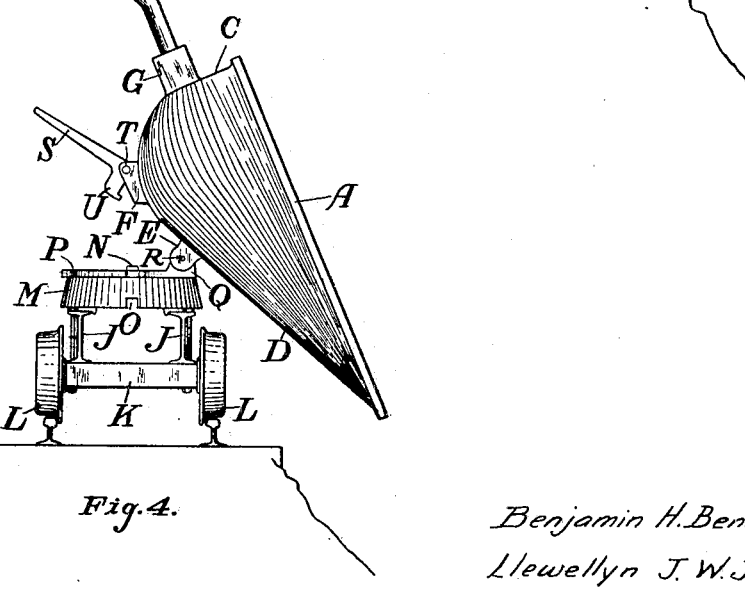

Figure 1 is a vertical longitudinal section of the upper part and a side view of the lower part of the car, one wheel thereof being removed from the axle. Fig. 2 is a plan of our car. Fig. 3 is a view showing our car dumping the slag forward, and Fig. 4 is a view showing it dumping to one side.

Similar letters of reference refer to similar parts throughout the several views.

In smelters located on tidal or on running water it is found that the wash of the water eats away the banks of slag, thus undermining the ground made by this slag, and it was with a view of overcoming this difficulty that the particular design of our slag-pot was conceived. Our pot is so designed that the slag is dumped therefrom in one large rock, starting from the pot without any assistance, such as hammering or prying, and leaving the pot clean. We mount our pot on a four-wheeled car in such a manner that the pot can be tipped in any direction, thus enabling the slag-rocks to be dumped to either side or in front. The slag falling in large rocks renders it much more difficult for the water to wash it away. It is often desired to turn a car around when taking it from one point to another; but with our car the pot can be turned, thus making our invention a readily-operated reversible car.

Proceeding now to the details of our invention, A represents the pot or bowl, having a generally-rectangular plan, with sides B converging slightly toward the bottom and having its rear end C curved, as shown in Fig. 1, and its bottom D rising from the center to the forward end in a substantially straight line. It will be readily seen that when the bottom D is tipped downward the mass of slag will slide thereon, because although the form of the pot A is rectangular, yet the sides B thereof diverge on lines parallel to the bottom D.

The pivot-lugs E are formed forward of the center of gravity of the pot A and the heel-lug F to the rear thereof. The pot is pivoted to the hereinafter-described turn-table by means of lugs E and rests on the turn-table when in its normal position on the lug F and the pivot through lugs E.

The socket G is cast on the rear end of the pot A and is adapted to receive the handle H, which is bent substantially as shown, so that when the pot is tipped for dumping the cross-bar I thereof will not be out of reach of the men operating the pot.

The car is made, preferably, of a pair of I-beams J, mounted on and secured to, by means of bolts, the two square steel axles K, having turned ends to receive the four wheels L, which run on the tracks leading from the smelting plant to the slag-dump.

To the top of the beams J is secured the circular casting M, provided with a central pivot-hole for the king-bolt N and with the slots O on the front and the rear center line, as shown in Figs. 1 and 4.

Resting on the top face of the casting M is the circular turn-table or plate P, having lugs Q, adapted to receive the pivot R, passing through them and the above-mentioned lugs E on the bowl A and being provided with a central hole through which a king-bolt N passes, pivotally securing the plate P to the casting M.

The locking-lever S is pivoted to the rear lug F of the bowl A by the pivot T and is provided with a downwardly-projecting hook end U, adapted to engage in either of the slots O in the casting M when the bowl A is in normal position and to lock it in place until the handle of lever S is lifted, disengaging the hook U from the casting M and allowing the bowl A to be turned, with the plate P, about the king-bolt N or allowing it to tip on the pivot R to dump the slag therefrom.

What we claim, and desire to secure by Letters Patent, is—

1. In a slag-car, the combination with a truck, of a slag-pot mounted on said truck and adapted to dump the slag in a solid mass in any direction from said truck, a hook pivoted to said slag-pot and adapted to engage said truck whereby said pot is prevented from turning on said truck and from tipping thereon, and a handle engaging the rear end of said slag-pot and bent so that when said pot is down said car may be pushed by said handle and when it is tipped up said handle may be within reach whereby the dumping of the slag may be controlled.

2. In a slag-car, the combination with the slag-pot, of a truck, a casting secured to said truck and provided with slots therein, a turn-table resting on and pivoted to said casting, a pivotal connection between said turn-table and said slag-pot, and a hook pivoted to said slag-pot and adapted to engage said slots in said casting whereby said turn-table is locked from turning and said slag-pot is locked from tipping.

3. In a slag-car, the combination with the truck, of a slag-pot pivoted thereto and having its forward end formed with a straight-rising bottom its sides being straight and converging toward its bottom and its rear end curved, substantially as shown and described.

4. In a slag-car, the combination with the truck, of a slag-pot pivoted thereto and formed so that its vertical longitudinal section has a bottom rising on a straight line toward the front and on a curved line toward the rear and its horizontal sections are rectangular, substantially as shown and described.

In testimony whereof we have signed our names to this specification in the presence of two subscribing witnesses.

BENJAMIN H. BENNETTS.
LLEWELLYN J. W. JONES.

Witnesses:
   H. A. ARMSTRONG,
   F. W. CLARK.